Jan. 9, 1923.
F. ZIMMER.
MOTOR SLED UNIT.
FILED SEPT. 17, 1920.
1,441,620.
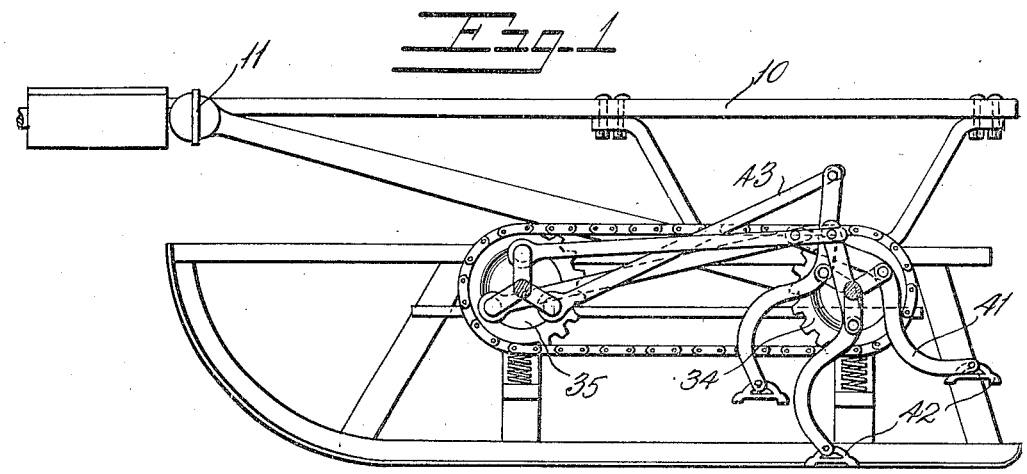
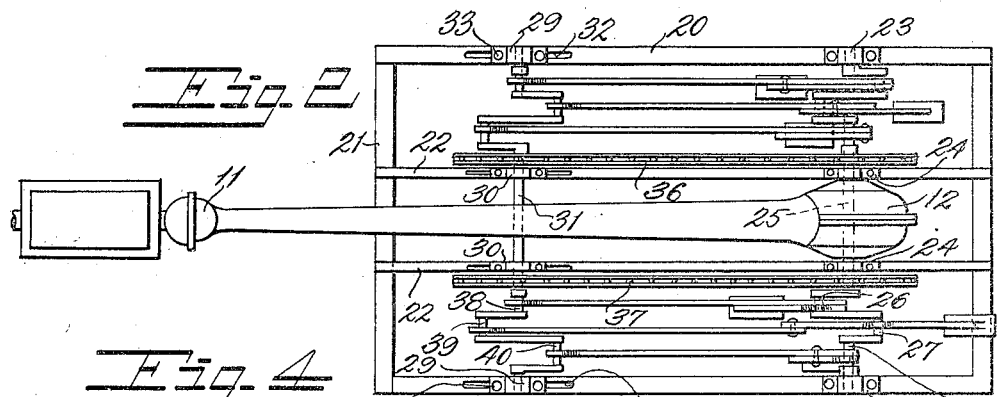
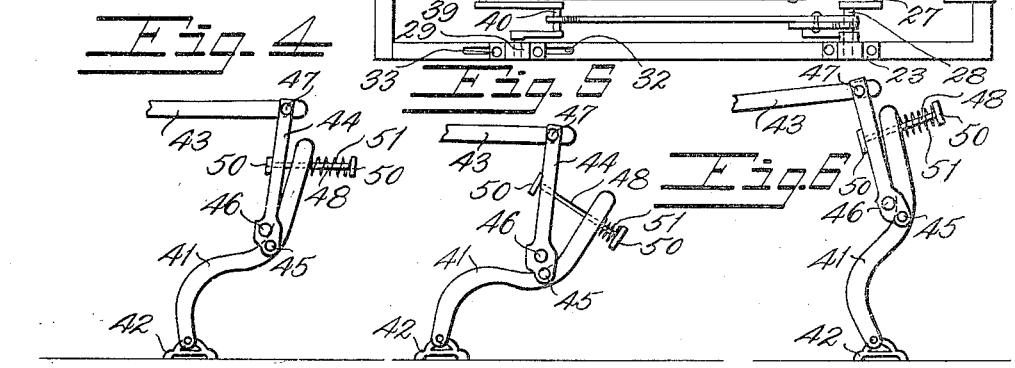
INVENTOR.
Frank Zimmer,
J. Reavy Kelly
ATTORNEY Patented Jan. 9, 1923.

1,441,620

UNITED STATES PATENT OFFICE.

FRANK ZIMMER, OF MIDDLEBURGH, NEW YORK.

MOTOR-SLED UNIT.

Application filed September 17, 1920. Serial No. 410,850.

*To all whom it may concern:*

Be it known that I, FRANK ZIMMER, citizen of the United States, residing at Middleburgh, in the county of Schoharie and State of New York, have invented certain new and useful Improvements in Motor-Sled Units, of which the following is a specification.

This invention relates to a motor sled unit adaptable for use in connection with conventional automobiles and motor trucks to supplant the ordinary drive wheels thereof when they are used on icy or snowy surfaces.

The principal object of the invention is to provide a motor sled unit which comprises in combination a series of independent propelling members operable so as to be moved in connection with the surface upon which the vehicle is traveling, in rotation and be given a sufficient thrust while in contact with said surface so as to cause the proper propelling of the vehicle.

Various other objects and advantages of my invention will become apparent during the continuance of the following description.

In the drawings:

Figure 1 is a view in side elevation of my invention in its preferred embodiment, the same being shown in connection with a portion of the chassis and driving mechanism of an automobile of conventional type.

Figure 2 is a view in top plan of my invention as shown in Figure 1.

Figure 3 is a side view of the sled unit without the propelling mechanism.

Figure 4 is a detail view of one of the propelling devices.

Figure 5 is a view similar to Figure 4 showing the position of the propelling device when the same receives the propelling thrusts from the driving mechanism of the machine.

Figure 6 is a view similar to Figure 4 and Figure 5 showing the propelling device finishing its propelling strokes.

For purposes of illustration I have shown in the accompanying drawings part of the chassis of an automobile of conventional construction, as indicated by the numeral 10, a universal joint 11 of the driving mechanism of an automobile and a transmission 12. However, this particular construction is shown merely for purposes of illustration and I do not wish to limit my invention in any way to this specific application.

The sled unit of my invention consists generally of a body member 13 carried upon the runner members 14 by means of rigid supports 15. Transverse bolsters 16 connect certain of the supports 15 and support the mechanism carrying frame 17 by means of expansion springs 18. Other springs 19 are interposed between the carrying frame 17 and the body portion 13 of the sled unit. This construction provides a yieldable support for the mechanism carrying frame 17 so that the knocks and jars received by the runners 14 and the body 13 incident to travel over an uneven surface will not be imparted to the frame 17 nor the mechanism carried thereby.

The frame 13 consists of longitudinal members 20 connected at their ends by means of transverse members 21. Other spaced longitudinal portion members 22 are carried by the transverse member 21 and are arranged preferably in the position shown in Figure 2 of the drawings. I do not wish to limit myself to the specific material used in the construction of the frame 17 or any part thereof.

Alined bearings 23 and 24 are carried by the longitudinal members 20 and 22 respectively of the frame 17 near the rear end thereof and receive a transverse shaft 25. That portion of the shaft 25 between the longitudinal members 22 of the frame extends through the transmission casing 12 and is directly connected with the driving mechanism of the automobile. On the other hand, that portion of the shaft which extends through the longitudinal members 22 and 20 is formed through a series of cranks 26, 27 and 28, the same extending at different angles from the shaft and being adapted to carry certain members, as will be hereinafter fully described.

Other alined bearings 29 and 30 are carried upon the longitudinal members 20 and 22 respectively of the frame 17 and are adapted to receive certain portions of a shaft 31. These bearings 29 and 30 are adjustable longitudinally with respect to the frame as shown in Figure 2 so that the distance from the shaft 25 may be properly regulated when the mechanism of the device is to be operated. The adjustment of the shaft and bearings may be retained by providing the longitudinal members 20 and 22 with longitudinal slots 32 and providing the bearings 29 and 30 with adjustable bearing members 33.

The shafts 25 and 31 are provided with alined sprocket wheels 34 and 35 over which travel the sprockets 36 and 37. By this arrangement motion is imparted from the shaft 25 to the shaft 31 when the former is in operation.

That portion of the shaft 31 that extends between the longitudinal members 22 and 20 is also provided with crank portions 38, 39 and 40, the purpose of which will be hereinafter fully described.

The crank portions 26, 27 and 28 of the shaft 25 have pivotally mounted thereon suitably curved propelling arms 41 which carry at their lower ends surface engaging feet 42 and at their upper ends are connected with operating rods 43. The other end of the operating rod 43 is connected with the crank portions 38, 39 and 40 of the shaft 31 so that upon rotation of the shaft 31 the rods 43 will impart rocking motion to the propelling arms 41.

When the shaft 25 is rotated the crank portions 26, 27 and 28 thereof cause a raising and lowering of the respective propelling arms 41 bringing the same in successive engagement with the surface upon which the sled unit is traveling. At the same time, the sprockets 36 and 37 impart rotation to the shaft 31 causing the rods 43 to be operated in succession and as each propelling arm 41 becomes in engagement with the surface upon which the sled is passing it will be rocked so that the foot 42 thereof will be given a thrust on the surface such as will propel the sled forward. In other words, while the shaft 25 raises and lowers the respective feet 42 into and out of engagement with the surface upon which the sled is established, the shaft 31 and the rod 43 cause a rocking of the arm 41 as the feet 42 thereof become engaged with the surface so as to cause the propelling of the sled unit.

Under certain circumstances, it is found to be advisable to provide certain means to take up the shock incident to the engagement of the feet 42 with the ground surface and in this connection I have shown in Figures 4, 5 and 6 certain modified forms of propelling arms. In these figures the arms 41 are carried upon other supplemental arms 44 as shown at 45, the arms 44 being carried on the crank portions 26, 27 and 28 of the shaft 25, the crank portions being received through openings 46 therein. The supplemental arms 44 are in turn pivotally connected as at 47 with the operating rod 43. The supplemental arms 44 further carry slidably mounted pins 48 which also extend through openings in the upper end of the arms 41. Each end of the pins 48 is provided with stops 50 while an extension spring 51 is interposed between one of the stops 50 and the arm 41 as clearly shown in Figures 4, 5 and 6. This construction provides for bringing the arms 41 yieldably in engagement with the ground surface and at the same time yieldably rocking the same upon the cranks 26, 27 and 28.

What is claimed is:

A motor sled unit comprising a sled member, a longitudinally extending platform arranged horizontally between the top of the sled and the runners thereof, expansion springs yieldably supporting the said platform and arranged above and below the same, a stepper shaft extending transversely of one end of the platform, a crank shaft extending transversely of the other end of the platform and in parallelism with the stepper shaft, steppers pivotally mounted on the stepper shaft and having operative connections with the cranks of the crank shaft, a driving connection between the crank shaft and the stepper shaft, and bearings at each end of the platform for supporting the said shaft, said bearings being relatively adjustable longitudinally of the platform.

In testimony whereof I affix my signature in presence of two witnesses.

FRANK ZIMMER.

Witnesses:
 WALTER BLISS,
 LYMAN DRIESBACH.